April 24, 1956 — P. J. CORSO — 2,742,816
PICTURE PROJECTION SCREEN
Filed Oct. 6, 1950 — 2 Sheets-Sheet 1
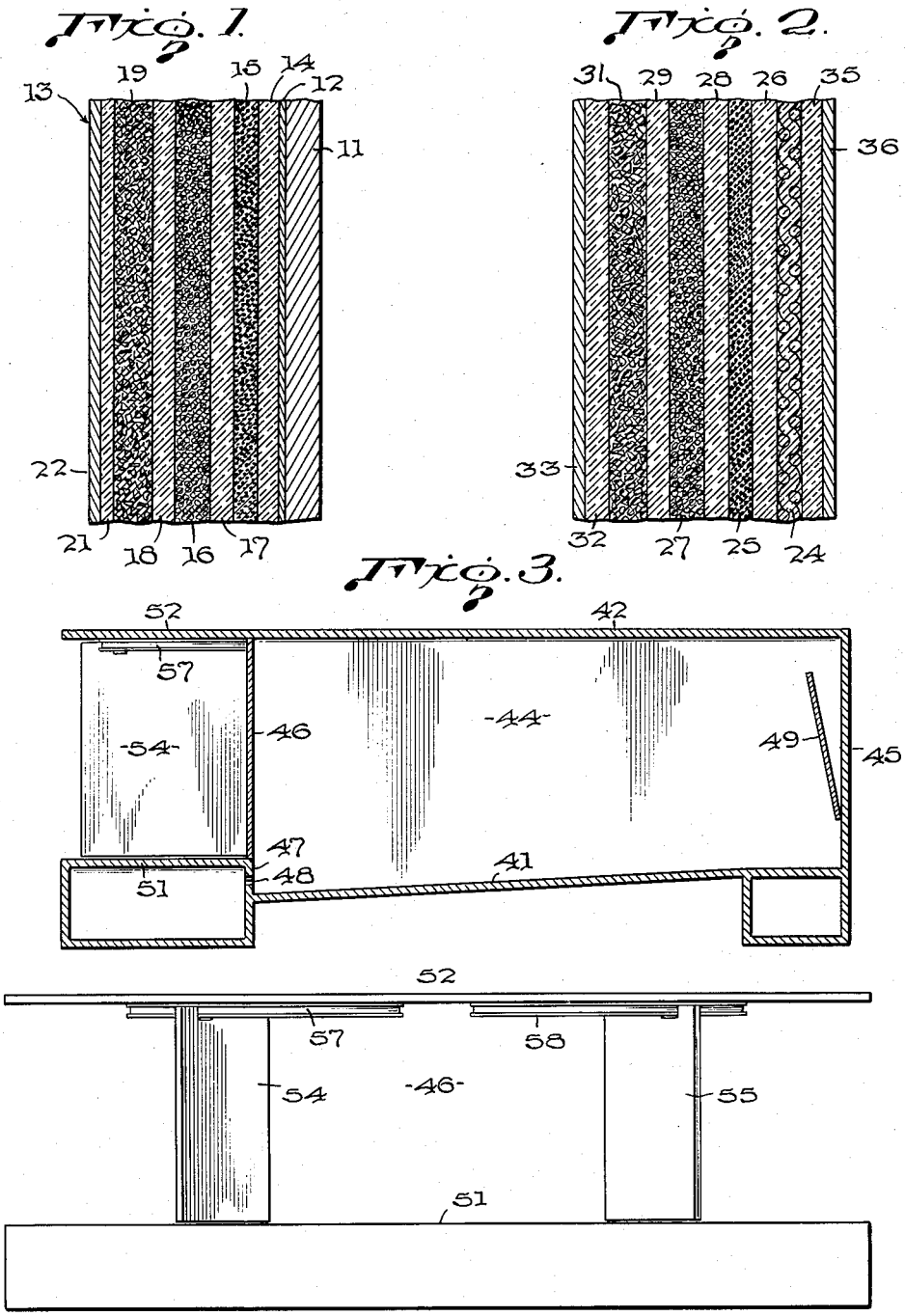
INVENTOR.
PHILIP J. CORSO
BY Church & Church
his ATTORNEYS

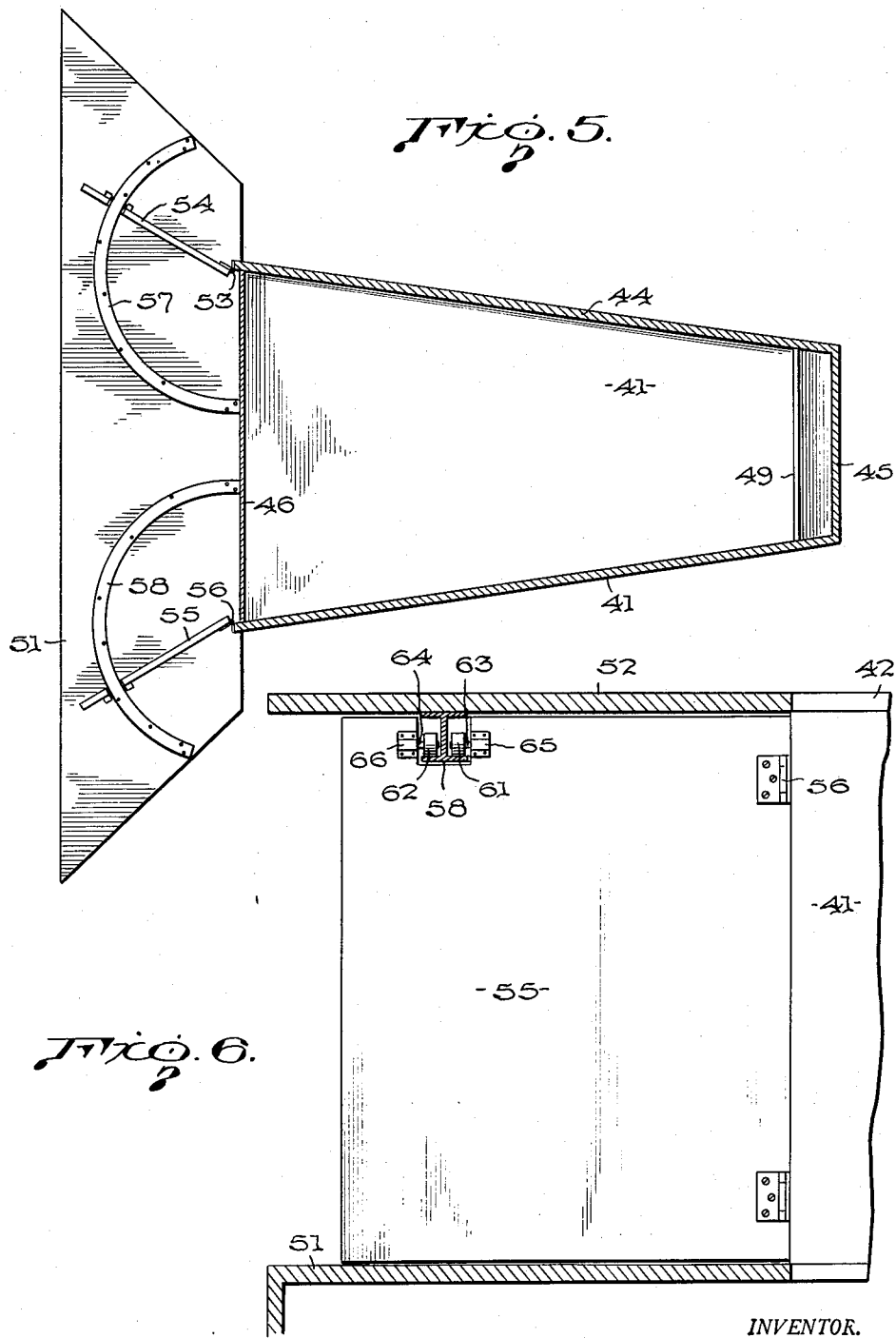

United States Patent Office 2,742,816
Patented Apr. 24, 1956

2,742,816

PICTURE PROJECTION SCREEN

Philip J. Corso, Pittsburgh, Pa.

Application October 6, 1950, Serial No. 188,783

4 Claims. (Cl. 88—28.9)

This invention relates to picture projection, particularly with reference to three dimensional, distortionless, glare proof projection screens and the method of making the same as well as outdoor motion picture projection apparatus in which one form of the screen may be advantageously used.

In this specification and the appended claims, the term "projection screen" means a surface for reflective or translucent reproduction of projected light corresponding an image impressed upon diapositives, films, or television tubes.

Since the advent of motion pictures, very little improvement has been realized in screens or any other type of image reproduction surfaces. Efforts to increase light intensity, improve reproduction of tone, eliminate distortion, and produce a third dimension effect have been attempted by changes in the lens system, the projector, or the lamp houses. Most such changes have been economically unsound.

Present day projection screens, such as those used for motion picture or television reproduction, possess numerous defects and imperfections, some of which are as follows:

1. Weak light in reproduction of images.
2. Uneven and/or distorted image reproduction.
3. Loss of efficiency due to accumulation of dust and dirt on surface of the screen.
4. Variations in and cessation of reflection due to internal breakdown of compositions such as paints, lacquers, and fabrics.
5. Reflection which is too strong (overradiation).

Because of these deficiencies, satisfactory image reproduction is greatly impeded and the projection light is wasted to a large degree.

Numerous technical attempts have been made to eliminate these defects. Some of the types of screens developed are linen and other textiles; paper or glued pasteboard; materials impregnated with white paint, metal, or special colors; stone, tinsel or plaster strips; plastics such as cellulose acetate; milk colored or dull glass or fiber glass; lacquer or glossy material forming a reflecting mass; and glass beads.

While some of these screens have partially eliminated some of the above-mentioned defects and deficiencies, none of them are sufficiently efficient to avoid all of these defects and deficiencies. Furthermore, none of these types of screens provide adequate reproduction of color tones or a third dimension effect. Some reflective screens use a basic white coating usually with textiles, paper, lacquer or glass beads. Translucent screens are usually made of plastic, dull glass, or fiber glass.

In addition to the listed defects and deficiencies, present day screens become impaired with age for the following reasons:

1. Waste or wearing of materials.
2. Fading of whiteness.
3. Temperature and atmospheric changes.
4. Absorption and surface reflection.

A major object of the invention is to provide a projection screen in which the impairments, defects and deficiencies are substantially eliminated. Another major object of this invention is to provide a projection screen with improved reproduction of color tones and increased depth or third dimension effect.

A further object of the invention is to provide a method of making a projection screen in which the objectionable impairments, defects and deficiencies are substantially eliminated and which improves color tone reproduction as well as depth or third dimensional effect.

In an outdoor theater a projection screen directly exposed to daylight cannot produce a distinct image because the daylight eliminates the shadows which defines the image projected on the screen. With the improved efficiency of a translucent screen embodying this invention, a greater external light is permissible. Despite the increased efficiency of screens embodying this invention, its use in daylight conditions may be improved by use of a light shield to reduce the external light falling upon the screen.

Another object of the invention is, therefore, to provide outdoor picture projection apparatus with an adjustable light shield so the exposure of the screen may be reduced during daylight without curtailing the theater capacity after dark.

In the attainment of these objects, one important feature of the invention resides in the arrangement of layers of light diffusing material in a plate-like body of transparent material forming a projection screen. Another feature is found in the provision of an insoluble gel as the exposed surface of the plate-like body forming the screen. Still another important feature resides in the provision of layers of light diffusing material of differing sizes.

In the method aspect of the invention, an important feature is found in the application of light diffusing material to a coating of liquid silicate of soda, drying the liquid silicate of soda and coating the layer with more liquid silicate of soda. Thus, a plate-like transparent screen is produced with light diffusing layers incorporated in the body.

In the aspect of the invention concerning outdoor picture projection apparatus, a feature of the invention resides in the arrangement of a light shield with its top and bottom extending horizontally outwardly from the top and bottom of the screen and extending laterally beyond the sides of the screen with side walls of the same height as the screen hinged to the side of the screen so they may swing to different oblique angles relative to the screen and thereby vary the exposure of the screen to external light and at the same time vary the field of view. Another feature resides in the arrangement of forwardly diverging side shields spaced from the sides of the screen. Still another feature resides in the arrangement of a light-tight housing with rearwardly diverging walls, the screen closing the upper portion of the front of the housing and a front wall closing the remainder of the front; a projector being positioned below the bottom of the light shield to project through the front wall rearwardly onto a reflector at the rear of the housing.

Other objects and features of the invention will become apparent from the following specification taken in conjunction with the accompanying drawings wherein:

Figure 1 is a cross-sectional view of a reflective screen embodying the invention;

Fig. 2 is a cross-sectional view of a translucent screen embodying the invention;

Fig. 3 is a longitudinal vertical sectional view of outdoor motion picture apparatus embodying the invention;

Fig. 4 is a front elevational view of the apparatus shown in Fig. 3;

Fig. 5 is a horizontal sectional view of the apparatus shown in Figs. 3 and 4; and Fig. 6 is a fragmentary sectional view of one of the pivoted side shields showing the guide rails therefor.

The reflector screen shown in Fig. 1 has a solid base 11 of wood, metal, or any other substance not subject to warpage. On one side of base 11 is a coating 12 of plaster of Paris, or other similar pure white substance which will not deteriorate. Integrally formed on base 11 and coating 12 is a plate-like body 13 preferably formed of vitreous material, such as silicate of soda, which is permanent and not subject to change by long exposure to the atmosphere. Incorporated in this plate-like body are a plurality of layers of light diffusing material. These layers are composed of vitreous particles and are separated by the transparent material of the body.

Separated from coating 12 by a coat 14 of silicate of soda is a layer 15 of small light diffusing particles such as granular silicate of soda. This light diffusing layer 15 is of a thickness corresponding to several silicate of soda particles and the particles are dispersed indiscriminately in the layer.

A second layer 16 of light diffusing particles is separated from the first layer 15 by a coat 17 of the transparent silicate of soda forming the body of the screen. This second layer 16 of light diffusing vitreous particles is preferably formed of globular glass beads dispersed indiscriminately through the layer to a substantially uniform thickness of several beads. The size of the beads is somewhat larger than the size of the silicate of soda grains forming the first light diffusing layer and the second layer is somewhat thicker than the first layer. Another coat 18 of silicate of soda separates the second light diffusing layer 16 from the third light diffusing layer 19 of glass splinters commercially known as "Diamond Dust." These glass splinters are indiscriminately arranged in the layer and are somewhat larger than the globular beads of the second layer. As the third light diffusing layer 19 is of a thickness corresponding to several glass splinters, the layer 19 is somewhat thicker than the layer 16. Covering the outer surface of light diffusing layer 19 is another coat 21 of silicate of soda the exposed surface of which is formed into an insoluble gel such as silicic acid.

The vastly improved reproduction of color tones and the depth or third dimension effect produced by this screen is probably due to the face that light of the same wave length entering the screen follow substantially the same path and is reflected and refracted throughout the different layers. For example, light entering the screen is first reflected by the insoluble gel surface 22 and the transparent coating 21. Then, light entering the light diffusing layer 19 is reflected from one particle to the other. In passing through the layer, some light may be refracted by individual particles. Light is then again refracted through transparent coat 18 and then reflected from one glass bead to another in passing through light diffusing layer 16. Again the light is refracted as it passes through transparent coat 17 and again reflected in all directions by the silicate of soda grains forming light diffusing layer 15. After being refracted by transparent coat 14, the light is reflected by the white surface of the plaster of Paris 12. This process is repeated as the reflected light again successively passes through the different layers and transparent coats separating the layers. Due to this continual reflection and refraction of the light the resultant image appearing on the exposed surface of the screen has a vastly improved color tone.

The incident reflection or diffusion of the light rays in all directions substantially eliminates distortion. As all light is reflected in the same manner over the whole surface of the screen, there is no distortion. This diffusion of the light also eliminates internal glare. Surface glare is controlled by the extent to which the insoluble gel coating 22 is made translucent.

Referring now to Fig. 2 the invention is shown as embodied in a translucent screen. Instead of the solid base of the reflective screen, the translucent screen shown in Fig. 2 has a translucent base 24 which is preferably made of a fabric. Particularly suitable for this purpose are fabrics of synthetic fibers such as nylon. This translucent screen has a light diffusing layer 25 of granular silicate of soda separated from base 24 by a transparent coat 26 of silicate of soda. A second light diffusing layer 27, which is preferably composed of globular glass beads is spaced from the first layer 25 by a transparent coat 28. Another transparent coat 29 separates outer light diffusing layer 31 of glass splinters from the light diffusing layer 27. An outer transparent coat 32 covers the outer surface of the light diffusing layer 31 and the exposed surface of the screen is protected by an insoluble silicate gel 33. To protect the other exposed surface of the screen, the other surface of base 24 is covered by a transparent coat 35 of silicate of soda which has its exposed surface protected by an insoluble gel 36. For best results, pictures are projected onto the side of the screen protected by the insoluble gel 36. It has been found that better images are reproduced on the screen if the layers of light diffusing particles are so arranged that the layer having the largest size particles are positioned nearest the viewing surface of the screen. In the case of the translucent screen, the light rays pass through the base and then through the silicate of soda grains in layer 25, the beads in layer 27, and the splinters in layer 31, before reaching the viewing surface of the screen. In the case of the reflected screen shown in Fig. 1, the light rays are first passed through the layers on the reflected surface 12 and then through the layers in the same order to reach the viewing surface of the screen.

In order to produce the screen as a plate-like body with the distinct light diffusing layers incorporated therein and forming an integral part of the screen a special method of making the screen was developed. In making the reflected screen, the plaster of Paris 12 is applied to the base in any conventional manner. Then, a thick coating of liquid silicate of soda is applied, as by brushing, on the plaster of Paris. The thickness of this coat 14 of silicate of soda may be increased by permitting the first coat to dry and then applying a second coat and so on until a thick coat has been built up. While the outer surface of the liquid silicate of soda is still wet, the granular silicate of soda is applied so it mixes with the liquid silicate of soda where it lies in suspension. The amount of granular silicate of soda mixed with the liquid silicate of soda depends upon the intensity of light desired to be transmitted through the layer. In this way, the light diffusing layer 15 is rendered more or less opaque. After the liquid silicate of soda with the granular silicate of soda forming layer 15 has completely dried, another coat of liquid silicate of soda is built up on the exposed surface of the layer 15. This forms a transparent coat 17 covering the entire layer 15. While the liquid silicate of soda of the transparent coat 17 is still wet, globular glass beads are sprinkled evenly over the wet silicate of soda until a layer is formed of a thickness corresponding to several beads. The liquid silicate of soda is then allowed to dry completely after which another transparent coat 18 is built up by applying liquid silicate of soda to the exposed surface of the layer 16. While this coat 18 is still wet, the glass splinters are sprinkled on the wet silicate of soda to a uniform thickness corresponding to several splinters. After the silicate of soda has completely dried, the second coat 21 of silicate of soda is applied to the exposed surface of the light diffusing layer 19 to form the insoluble gel 22 on the exposed surface of the screen, the liquid silicate of soda forming transparent coat 21 is allowed to completely harden, then sulfuric acid is brushed over the hardened silicate of soda. The translucence of the insoluble gel surface may be controlled by controlling the concentration of the sulfuric acid used to form the gel. Presumably, this gel is composed, at least in part, of insoluble silicic acid.

In making the translucent screen shown in Fig. 2, the base 24 of nylon fabric is coated on both sides with liquid silicate of soda to form the transparent coats 26 and 35. While the liquid silicate of soda forming layer 26 is still wet, the granular silicate of soda is applied in suspension. After the silicate of soda hardens, another coat 28 of liquid silicate of soda is applied. While this coat 28 is still wet, glass beads forming layer 27 are sprinkled to a thickness corresponding to several beads. Again, the liquid silicate of soda is allowed to dry and then the exposed surface of the layer 27 is coated with more liquid silicate of soda to form the transparent coat 29. While this coat 29 is still wet, the final light diffusing layer 31 is formed by sprinkling glass splinters on the wet silicate of soda. After the silicate of soda dries completely the final coat 32 of liquid silicate of soda is applied. When this is dried sulfuric acid of a selected concentration is brushed over the exposed surface to produce the insoluble gel 33 protecting the surface of the screen. Also, sulfuric acid is brushed over the exposed surface of the coat 35 to form the insoluble gel 36.

In accordance with the invention the screen not only eliminates the various defects and deficiencies of previous screens but produces improved reproduction of color tones and shades of black and white so the eye is able to perceive minute shading differences which define the depth of the image. Furthermore, as the layers of which the screen is made are composed of a vitreous material, the completed plate-like screen is a composite glass mass in which distinct light diffusing layers of different size particles are incorporated. The permanency of the glass, particularly with the insoluble gel protection eliminates any question of wear or distortion.

Inasmuch as the screen is particularly useful in outdoor picture projection, apparatus, apparatus embodying this screen and other features of the invention is illustrated in Figs. 3 to 6, inclusive. This apparatus has a light-tight housing of rectangular cross-section formed by rearwardly converging floor 41 and roof 42 with rearwardly converging side walls 43 and 44. The smaller end of this light-tight housing is closed by a rear wall 45. The upper portion of the front end of the light-tight housing is closed by translucent screen 46, which is made like the screen shown in Fig. 2. The lower portion of the front end of the housing is closed by a front wall 47. This wall 47 is provided with an aperture 48 through which rays from a projector (not shown) may be directed rearwardly through the light-tight housing onto a reflector 49 at the rear of the housing from which the rays are reflected onto the rear of the screen 46. The screen 46 has its outer face protected by a light shield. This light shield is composed of a bottom 51 extending upwardly from the bottom edge of the screen 46 and the top edge of the front wall 47. This bottom 51 extends laterally beyond the sides of the screen 46. The top 52 of the light shield extends horizontally forwardly from the top of the screen 46 and extends laterally beyond the sides of the screen 46 in the same manner as the bottom 51. Hinged to one side of the screen 46 as by hinges 53, 53, is a door 54 of the same height as the screen and of a width corresponding to half the width of the screen. A similar door 55 is hinged at 56, 56, to the other side of the screen. If desired, to support the weight of these doors for free movement, arcuate rails 57 and 58 may be suspended from the top 52 of the light-tight housing in the manner shown in Fig. 6. As there illustrated, the rail 57 is of I-beam formation and the door 54 is cut out at its upper end to accommodate the rail. Rollers 61 and 62 are carried by shafts 63 and 64 supported on the door 54 by brackets 65 and 66.

With this compact arrangement, pictures are directed from the projection booth below the bottom 51 of the light shield through aperture 48 in the front wall 47 onto the reflector 49 and then onto the rear of the translucent screen 46. During daylight hours, the doors 54 and 55 are arranged at a relatively small oblique angle with respect to the screen 46. During the evening and into the night, the angular position of the doors may be increased as a necessity for shading the screen decreases. In this way the capacity of the threater is increased, because with the improved screen of this invention, the lack of distortion permits satisfactory viewing of the screen from a side position. Thus, during daylight hours, the exposure of the screen is reduced, whereas, as darkness descends, the exposure of the screen and capacity of the theater are increased by gradually swinging the doors outwardly to greater oblique angles with respect to the screen. When the picture projection apparatus is not in use the doors may be closed over the screen to protect the screen.

While the foregoing description and accompanying drawings relate to preferred embodiments of the invention, it is expected that these embodiments may be modified without departing from the invention so this specification and the drawings are intended to illustrate the invention but not to be interpreted in a restrictive manner.

What is claimed is:

1. A translucent screen comprising a plate-like body of silicate of soda having incorporated therein a fabric base, a layer of granular silicate of soda adjacent said base, a layer of globular glass beads and a layer of glass splinters, each of said layers being parallel to said base and separated by the silicate of soda forming said body, said layer of granular silicate of soda being interposed between said layer of beads and said base, the exposed surfaces of said silicate of soda body being formed of an insoluble translucent gel.

2. A projection screen comprising a base, a plate-like body of silicate of soda adhering to said base and having incorporated therein a layer of granular silicate of soda adjacent said base, a first layer of glass particles and a second layer of glass particles, each of said layers being parallel to said base and separated by the silicate of soda forming said body, said layer of granular silicate of soda being interposed between one of said layers of glass particles and said base, the exposed surface of said silicate of soda body being formed of an insoluble translucent gel.

3. A translucent screen comprising a fabric base, a plate-like body of silicate of soda adhering to said base, a layer of granular silicate of soda adjacent said base, a first layer of glass particles and a second layer of glass particles, each of said layers being parallel to said base and separated by the silicate of soda forming said body, said layer of granular silicate of soda being interposed between one of said layers of glass particles and said base, the exposed surfaces of said silicate of soda being formed of an insoluble translucent gel.

4. A reflective screen comprising a base, a reflective coating on said base, a plate-like body of silicate of soda adhering to the coated side of said base, a layer of granular silicate of soda adjacent said base, a first layer of glass particles and a second layer of glass particles, each of said layers being parallel to said base and separated by the silicate of soda forming said body, said layer of granular silicate of soda being interposed between one of said layers of glass particles and said base, the exposed surfaces of said silicate of soda being formed of an insoluble translucent gel.

References Cited in the file of this patent

UNITED STATES PATENTS

| | | |
|---|---|---|
| 389,526 | Moore | Sept. 11, 1888 |
| 1,152,620 | Flogerzi | Sept. 7, 1915 |

(Other references on following page)

UNITED STATES PATENTS

| | | |
|---|---|---|
| 1,176,746 | Federico | Mar. 28, 1916 |
| 1,563,584 | O'Shaughnessy | Dec. 1, 1925 |
| 1,747,425 | Cawley | Feb. 18, 1930 |
| 1,891,849 | Suzuki | Dec. 20, 1932 |
| 1,926,923 | Suzuki | Sept. 12, 1933 |
| 1,943,995 | Weld | Jan. 16, 1934 |
| 1,944,187 | Marsat | Jan. 23, 1934 |
| 2,032,363 | Holden | Mar. 3, 1936 |
| 2,150,992 | Scott | Mar. 21, 1939 |
| 2,174,778 | Croft | Oct. 3, 1939 |
| 2,180,113 | Land | Nov. 14, 1939 |
| 2,210,806 | Etbauer | Aug. 6, 1940 |
| 2,366,516 | Geffcken et al. | Jan. 2, 1945 |
| 2,531,945 | Moulton | Nov. 28, 1950 |